United States Patent
Luo et al.

(10) Patent No.: US 8,260,140 B2
(45) Date of Patent: Sep. 4, 2012

(54) WDM PASSIVE OPTICAL NETWORK WITH PARALLEL SIGNAL DETECTION FOR VIDEO AND DATA DELIVERY

(75) Inventors: Yuanqiu Luo, Hightstown, NJ (US); Jianjun Yu, Stone Mountain, GA (US); Junqiang Hu, Davis, CA (US); Lei Xu, Princeton, NJ (US); Philip Nan Ji, Princeton, NJ (US); Ting Wang, Princeton, NJ (US); Milorad Cvijetic, Herndon, VA (US)

(73) Assignee: NEC Laboratories America, Inc., Princeton, NJ (US)

( * ) Notice: Subject to any disclaimer, the term of this patent is extended or adjusted under 35 U.S.C. 154(b) by 855 days.

(21) Appl. No.: 11/940,419

(22) Filed: Nov. 15, 2007

(65) Prior Publication Data
US 2008/0166129 A1    Jul. 10, 2008

Related U.S. Application Data

(60) Provisional application No. 60/884,046, filed on Jan. 9, 2007.

(51) Int. Cl.
*H04J 14/02* (2006.01)
(52) U.S. Cl. ............... 398/87; 398/84; 398/70; 398/71; 398/72
(58) Field of Classification Search ............ 398/79, 398/82, 84, 87, 70, 71, 72
See application file for complete search history.

(56) References Cited

U.S. PATENT DOCUMENTS

| | | | | |
|---|---|---|---|---|
| 6,385,366 | B1 * | 5/2002 | Lin | 385/24 |
| 7,088,922 | B2 * | 8/2006 | Tomofuji et al. | 398/95 |
| 2002/0024693 | A1 * | 2/2002 | Manor et al. | 359/124 |
| 2003/0053166 | A1 * | 3/2003 | Hamm et al. | 359/124 |

OTHER PUBLICATIONS

Milan Khanal, et al., Selective Broadcasting of Digital Video Signals Over a WDM Passive Optical Network; IEEE Photonics Technology Letters, vol. 17, No. 9, Sep. 2005; pp. 1992-1994.

Xu et al., Novel Triplexer Transceiver Design Using Parallel Signal Detection for Applications in Broadband Passive Optical Networks (B-PON); NEC-Labs Technical Report, Mar. 2005; 22 pages.

O. Akanbi et al., A New Scheme for Bidirectional WDM-PON Using Upstream and Downstream Channels Generated by Optical Carrier Suppression and Separation Technique; IEEE Photonics Technology Letters, vol. 18, No. 2; Jan. 2006; pp. 340-342.

* cited by examiner

*Primary Examiner* — M. R. Sedighian
(74) *Attorney, Agent, or Firm* — James Bitetto; Joseph Kolodka

(57) ABSTRACT

An optical network component, architecture and method for a wavelength division multiplexed passive optical network includes a band coupler configured to demultiplex first and second wavelength division multiplexed content transmitted from an optical line terminal into a first band signal and a second band signal. An arrayed wavelength grating is configured to receive the first band signal and to further demultiplex the first band signal into different wavelengths to provide a plurality of wavelength signals. An optical splitter is configured to split the second band signal into sub-signals and multiplex the sub-signals with each of the wavelength signals such that the first and second wavelength division multiplexed content is provided on a single wavelength to a user.

6 Claims, 4 Drawing Sheets

WDM PASSIVE OPTICAL NETWORK WITH PARALLEL SIGNAL DETECTION FOR VIDEO AND DATA DELIVERY

RELATED APPLICATION INFORMATION

This application claims priority to provisional application Ser. No. 60/884,046 filed on Jan. 9, 2007, incorporated herein by reference.

BACKGROUND

1. Technical Field

The present invention relates to optical networks and more particularly to a wavelength division multiplexed passive optical network (WDM-PON) that delivers data and video services using subcarrier modulation at an optical line terminal (OLT) and parallel signal detection (PSD) at an optical network unit (ONU).

2. Description of the Related Art

With the expansion of user demands, access networks with much higher bandwidth than digital subscriber lines (DSL) and cable modems are needed. In particular, the need for providing emerging video services, including video on demand (VOD), high definition television (HDTV), and video blogs, further spurs the need for high bandwidth solutions.

With the growing amount of Passive Optical Network (PON) subscribers, annual sales of the PON equipment and sales are projected to grow accordingly. Transmission over such networks may be limited by the increasing data demand on existing passive optical networks. Limited bandwidth often results in limited services being provided to customers. Overcoming bandwidth issues by deploying additional fiber is often undesirable due to the large expenses associated therewith.

Furthermore, additional interfaces and/or equipment needed for additional optical fiber branches will further introduce ongoing management costs. Such costs are detrimental to providing broadband and other services in a competitive service provider market.

Conventional wavelength division multiplexed passive optical networks (WDM-PONs) use different receivers at different users. This contributes to the high cost of WDM-PONs solutions. To carry video signals to users, these WDM-PONs need a larger number of available wavelengths. For example, each user needs two wavelengths: one for data and one for video. To support n users, 2n wavelengths are needed. This increases the requirement for WDM devices in the system and therefore increases the cost of the WDM-PON.

SUMMARY

A novel WDM Passive Optical Network (WDM-PON), which delivers data as well as video services to the end users through the employment of subcarrier modulation at the optical line terminal (OLT) and parallel signal detection (PSD) at the optical network unit (ONU) is disclosed. Experimental results show that the proposed WDM-PON is capable of providing triple play services (voice, data, video) in an access network.

An optical network component, architecture and method for a wavelength division multiplexed passive optical network includes a band coupler configured to demultiplex first and second wavelength division multiplexed content transmitted from an optical line terminal into a first band signal and a second band signal. A multiplexer (e.g., an arrayed wavelength grating) is configured to receive the first band signal and to further demultiplex the first band signal into different wavelengths to provide a plurality of wavelength signals. An optical splitter is configured to split the second band signal into sub-signals and multiplex the sub-signals with each of the wavelength signals such that the first and second wavelength division multiplexed content is provided on a single wavelength to a user.

A wavelength division multiplexed passive optical network architecture includes an optical line terminal configured to transmit first and second wavelength division multiplexed content over an optical link and receive signals from the optical link. A remote node is coupled to the optical link. The remote node comprises a band coupler configured to demultiplex first and second wavelength division multiplexed content transmitted from the optical line terminal into a first band signal and a second band signal; an arrayed wavelength grating configured to receive the first band signal and to further demultiplex the first band signal into different wavelengths to provide a plurality of wavelength signals; and an optical splitter configured to split the second band signal into sub-signals and multiplex the sub-signals with each of the wavelength signals such that the first and second wavelength division multiplexed content is provided on a single wavelength. A plurality of optical network units (ONU) is included. Each ONU is configured to receive both the first and second wavelength division multiplexed content on the single wavelength where different wavelengths are sent to each of the optical network units.

A method for delivering data and video services over a wavelength division multiplexed passive optical network includes wavelength division multiplexing at least one data channel and at least one video channel for transmission over an optical link using subcarrier modulation to provide wavelength division multiplexed content; at a remote location, demultiplexing the wavelength division multiplexed content received from the optical link into a first band signal and a second band signal; demultiplexing the first band signal into different wavelengths to provide a plurality of wavelength signals; splitting the second band signal into sub-signals; and multiplexing the sub-signals with each of the wavelength signals such that the wavelength division multiplexed content including data and video content are provided on a single wavelength to a user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Wavelength division multiplexing (WDM) with passive optical components may be employed in an access network. WDM passive optical network (WDM-PON) technology is different from traditional time division multiplexed PON (TDM-PON), such as BPON, EPON, and GPON. WDM-PON allocates different wavelengths to each optical network unit (ONU), providing a separate point-to-point (P2P) connection between an optical network unit (ONU) and its associated optical line terminal (OLT).

In accordance with the present principles, a new WDM-PON architecture is provided which focuses on high-speed data transmission and, especially, video service delivery. Subcarrier modulation (SCM) techniques are employed to transmit downstream video services. At the user side, parallel signal detection (PSD) is adopted to receive both data and video signals by employing one photodetector (PD). The uniform receiver design with PSD reduces the WDM-PON cost.

The WDM-PON in accordance with the present principles has lower costs. By employing SCM and PSD, a uniform design is enabled for WDM-PON receivers at the user side. Low cost filters are used to detect data and video signals simultaneously, and a number of photodetectors employed is reduced. Using this new architecture, we have demonstrated error-free 2.5-Gb/s data and 622-Mb/s video transmissions over a 20-km single-mode fiber (SMF-28).

Embodiments of the present invention can take the form of an entirely hardware embodiment, an entirely software embodiment or an embodiment including both hardware and software elements. In a preferred embodiment, the present invention is implemented in hardware having software elements, which include but are not limited to firmware, resident software, microcode, etc.

It is to be understood that the present embodiments are described in terms of a passive optical network (PON); however, other optical networks are contemplated and may benefit for the present teachings. While the FIGS. show illustrative optical hardware configurations, these configurations may be reconfigured or combined to provide functionality within the scope of the present principles.

Figure 1:
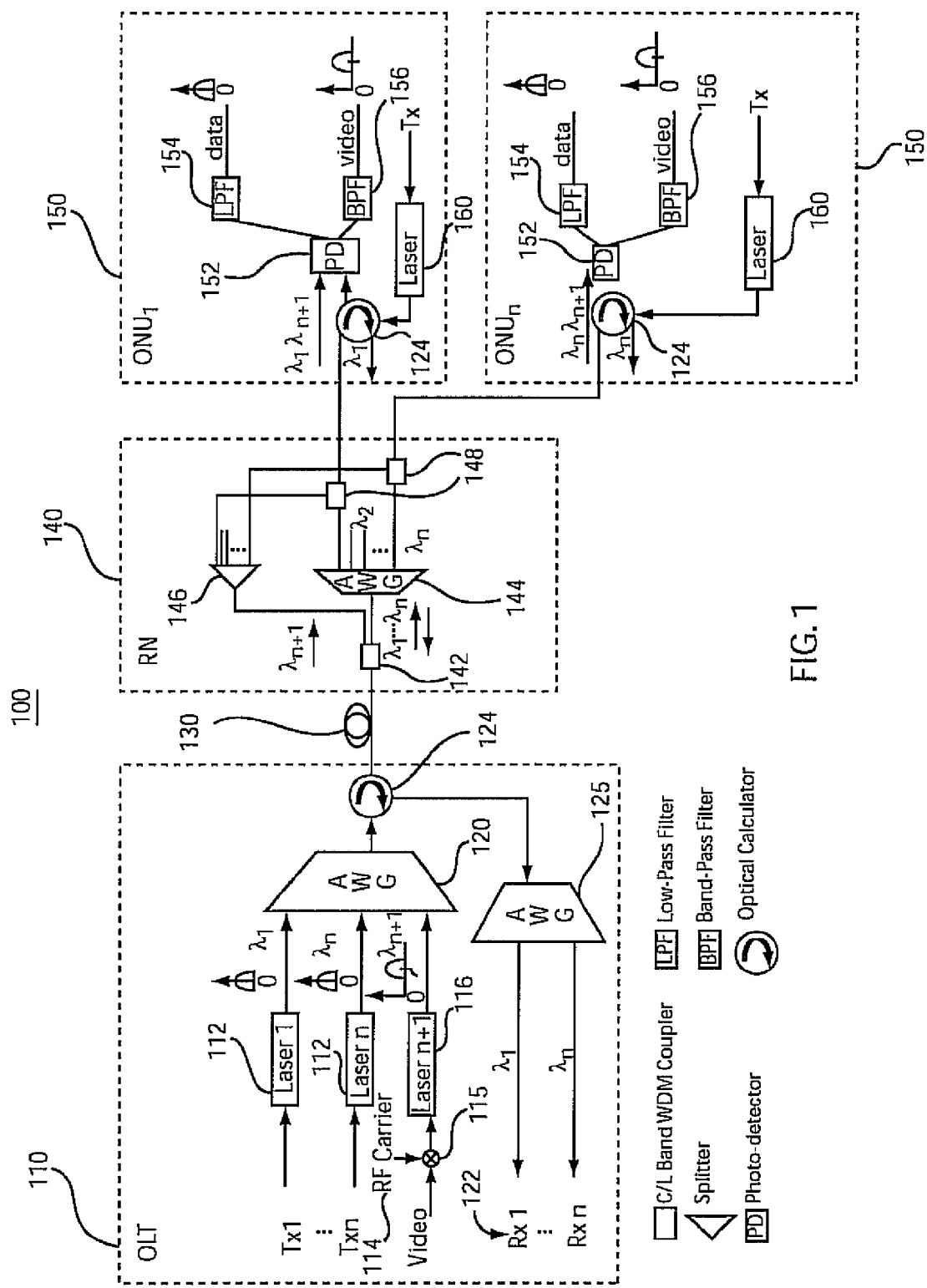
FIG. 1 is a schematic diagram showing a wavelength division multiplexed passive optical network (WDM-PON) architecture in accordance with the present principles.

Referring now to the drawings in which like numerals represent the same or similar elements and initially to FIG. 1, a WDM-PON system 100 is schematically depicted in accordance with one illustrative embodiment. WDM-PON system 100 includes an optical line terminal (OLT) 110, which may be located upstream at a service provider's location. The OLT 110 includes n C-band distributed feedback (DFB) laser sources 112 for baseband data delivery. C-band is a portion of the electromagnetic spectrum in the GHz range as is known in the art. A video signal (Video) is shifted to a higher frequency band using an RF carrier 114 and a mixer 115. Sub-carrier modulation (SCM) is employed to provide a plurality of wavelengths for transmissions Tx1 to Txn and Video. An L-band DFB laser source 116 is employed to provide wavelength signals for the video. L-band is another portion of the electromagnetic spectrum as is known in the art.

The (n+1) wavelength signals ($\lambda_1$ to $\lambda_{n+1}$) are multiplexed by an arrayed wavelength grating (AWG) 120 into a single-mode feeder fiber 130. Upstream data receivers 122 at the OLT 110 are attached to an optical circulator (OC) 124, which blocks the downstream signals from entering the upstream channels. The signal received from the link 130 is demultiplexed using an AWG 125.

At a remote node 140, downstream data and video signals are first demultiplexed by a C/L band WDM coupler 142. The C-band data signals are further demultiplexed by an AWG 144 into different wavelengths. A 1:n passive optical splitter 146 splits the L-band video signal into n sub-signals, which are then multiplexed with couplers 148 with one demultiplexed C-band wavelength.

Advantageously, video signals are multiplexed with the data signals using the C/L couplers 142 and 148. This obviates the need for expensive optical modulators. In addition the video signals are transmitted using a single dedicated wavelength thereby making the video information more secure.

At an optical network unit (ONU) 150, only one photodetector (PD) 152 is used to detect both data and video signals from an optical carrier. Following PD 152, a low-pass filter 154 and a band-pass filter 156 are adopted to separate the baseband data and SCM video signals, respectively. As a result, the downstream data and video signals are detected and recovered simultaneously. A laser source (DFB) 160 is employed transmitting signals back upstream to the OLT 110.

Figure 2:
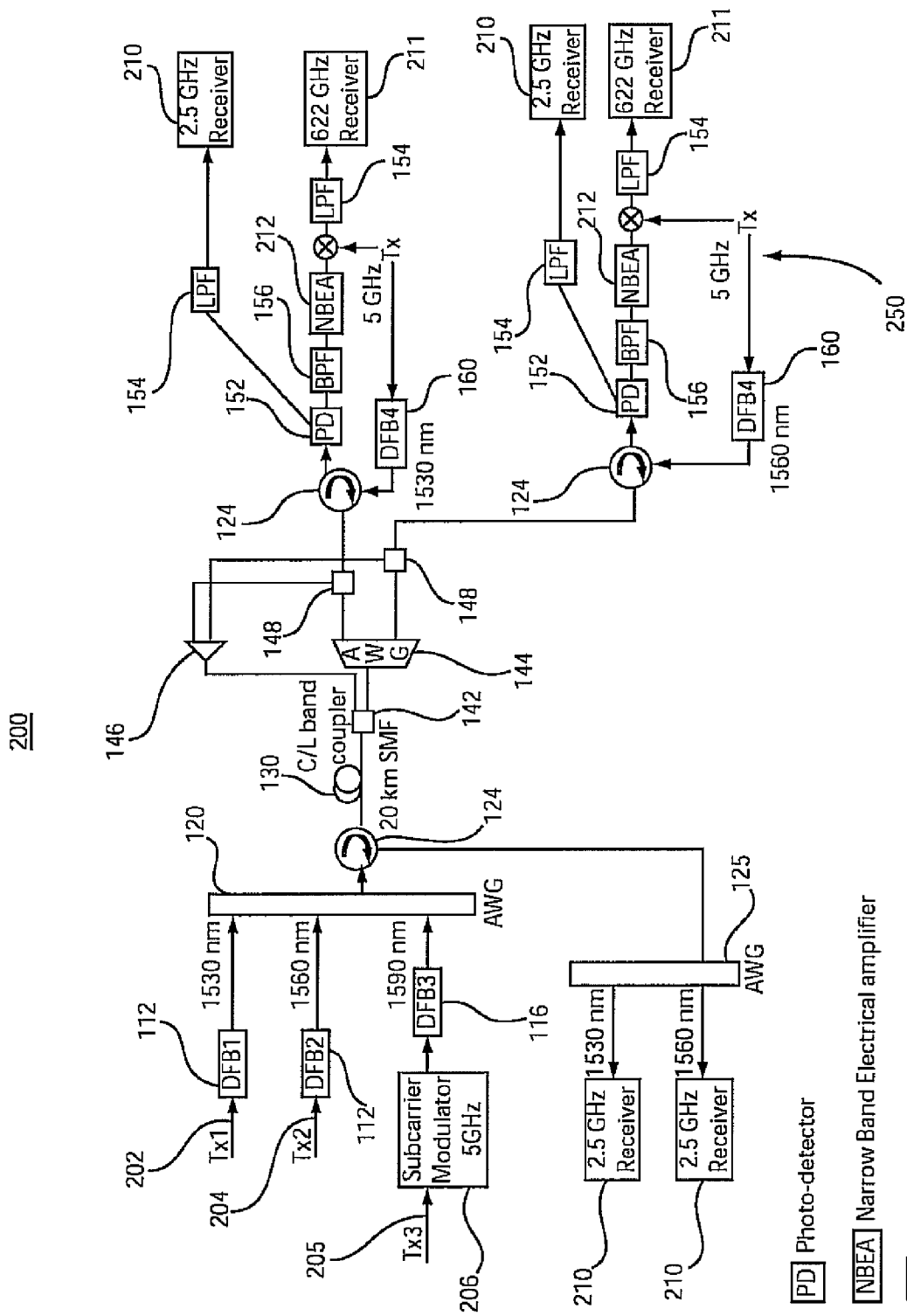
FIG. 2 is a schematic diagram showing a WDM-PON test bed employing the architecture in accordance with the present principles.

Experimental Setup and Results:

Referring to FIG. 2, an experimental setup 200 is depicted for testing a system in accordance with the present principles. Two data channels 202 and 204 (e.g., 1530 nm and 1560 nm) transmit both upstream and downstream traffic between end users and a central office over a single mode fiber (e.g., 20 km). The bit rate of the downstream signals was 2.5-Gb/s, while the bit rate of a video signal 205 (Tx3) was 622-Mb/s. This video signal (Tx3) is mixed with a 5 GHz carrier before being used to drive an external $LiNbO_3$ modulator 206 to generate subcarrier multiplexing signals. Laser sources 116 are employed on all transmission paths and 2.5 GHz receivers 210 (e.g., Avalanche Photodiode (APD) receivers) were employed on both ends. A 2-5 GHz pass-band filter 156 (BPF), a narrow-band electronic amplifier (NBEA) 212, a 5 GHz mixer 214 (mixer), and a low-pass filter 154 (LPF) are employed at a user side 250 for video signal receiving.

The optical network 200 was employed to test a wavelength division multiplexed passive optical network (WDM-PON) that delivers data and video services using subcarrier modulation at an optical line terminal (OLT) and parallel signal detection (PSD) at an optical network unit (ONU).

Figure 3:
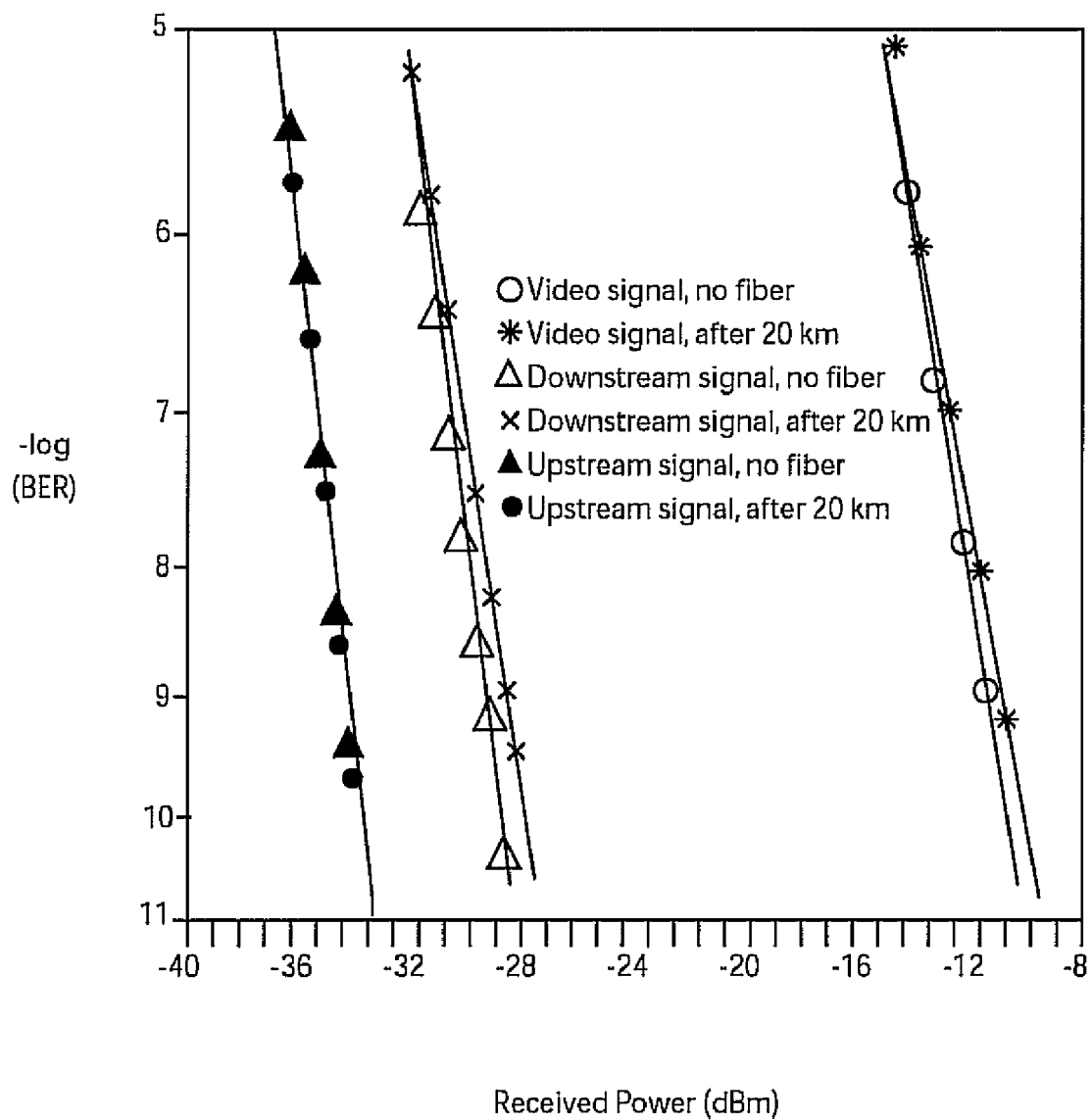
FIG. 3 is a log-log plot of bit error rate (BER) versus received power (dBm) for different signals in the system in accordance with the architecture of FIG. 2.

BER measurement results are shown for system 200 in FIG. 3, where the upstream and downstream signals are detected by an APD receiver 210 with an optimized configuration, while video signals are detected by a PIN receiver 211 not optimized for a 622-Mb/s signal.

Referring to FIG. 3, both data and video transmissions show very small power penalties while achieving the advantages of the present principles. The experimental results demonstrate that by employing the low-cost electric filters, the baseband data signal and the modulated video signal are correctly detected simultaneously at the user side, and thus, uniform receivers (same wavelength for both data and video) can be deployed to further reduce the WDM-PON expense.

A new WDM-PON architecture has been provided, which enables video delivery by using PSD technology. We have generated 2.5-Gb/s data and 622-Mb/s video signals and tested their performance in the test bed. These performance numbers are provided to demonstrate superior bit rates over conventional technology. However, these performance numbers are illustrative, and other performance numbers may be achieved in accordance with the present principles. The experimental results show that the combination of low-cost filters and coarse photodetectors (PD) make the present embodiments suitable and desirable for video service delivery over a WDM access network.

Figure 4:
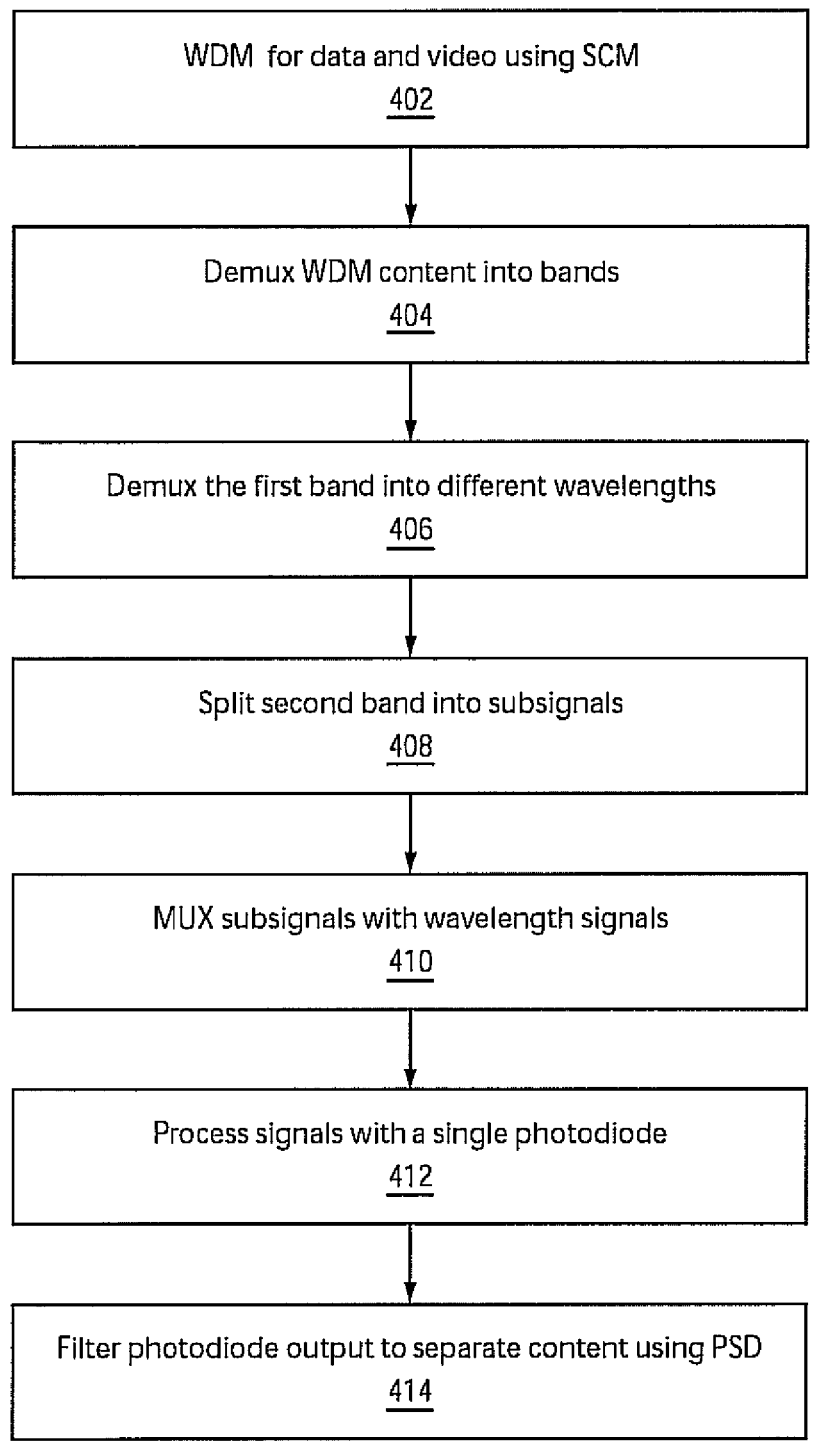
FIG. 4 is a block/flow diagram showing a method for transferring optical signals in accordance with the present principles.

Referring to FIG. 4, a method for delivering services over a wavelength division multiplexed passive optical network is illustrative shown. Service may include data, voice, video or any combination thereof. For purposes herein, voice information will be treated the same as data for simplicity of explanation. In block 402, wavelength division multiplexing is performed for at least one data channel and at least one video channel for transmission over an optical link using subcarrier modulation to provide wavelength division multiplexed content. The wavelength division multiplexed content may include data signals and video signals, wherein the data signals may include a bit rate of at least 2.5 Gbit/second and the video signals may include a bit rate of at least 622 Mbit/second. Other bit rates are also contemplated.

In block 404, at a remote location, such as at a user site or at a location some distance from the service provider or the OLT, demultiplex the wavelength division multiplexed content received from the optical link into a first band signal and a second band signal, e.g., C-band and L-band). In block 406, demultiplex the first band signal into different wavelengths to provide a plurality of wavelength signals. In block 408, split the second band signal into sub-signals. In block 410, multiplex the sub-signals with each of the wavelength signals such that the wavelength division multiplexed content including data and video content are provided on a single wavelength to a user.

In block 412, the single wavelength is processed using a single photodiode. An output of the photodiode is filtered to separate a first wavelength division multiplexed content from a second wavelength division multiplexed content using parallel signal detection in block 414.

Having described preferred embodiments for systems and methods for WDM passive optical networks with parallel signal detection for video and data delivery (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A wavelength division multiplexed passive optical network architecture, comprising:
   an optical line terminal configured to transmit first and second wavelength division multiplexed content over an optical link and receive signals from the optical link;
   a remote node coupled to the optical link, the remote node comprising:
      a band coupler configured to demultiplex first and second wavelength division multiplexed content transmitted from the optical line terminal into a first band signal and a second band signal;
      an arrayed wavelength grating configured to receive the first band signal and to further demultiplex the first band signal into different wavelengths to provide a plurality of wavelength signals; and
      an optical splitter configured to split the second band signal into sub-signals and multiplex the sub-signals with each of the wavelength signals such that the first and second wavelength division multiplexed content is provided on a single wavelength; and
   a plurality of optical network units, each configured to receive both the first and second wavelength division multiplexed content on the single wavelength where different wavelengths are sent to each of the optical network units.

2. The architecture as recited in claim 1, wherein the at least one optical network unit includes a single photodiode configured to process the single wavelength.

3. The architecture as recited in claim 2, wherein an output of the photodiode is filtered to separate the first wavelength division multiplexed content from the second wavelength division multiplexed content using parallel signal detection.

4. The architecture as recited in claim 1, wherein the first and second wavelength division multiplexed content includes at least one video signal and at least one data signal modulated together using subcarrier modulation.

5. The architecture as recited in claim 4, wherein the data signals include a bit rate of at least 2.5 Gbit/second.

6. The architecture as recited in claim 4, wherein the video signals include a bit rate of at least 622 Mbit/second.

* * * * *